(12) United States Patent
Gilliam et al.

(10) Patent No.: US 8,666,989 B1
(45) Date of Patent: Mar. 4, 2014

(54) ADAPTIVE DISTRIBUTED INDEXING OF LOCAL ADVERTS

(75) Inventors: Emil Gilliam, Mountain View, CA (US); Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/310,288

(22) Filed: Dec. 2, 2011

(51) Int. Cl.
*G06F 7/00* (2006.01)
*G06F 17/30* (2006.01)

(52) U.S. Cl.
USPC ....... 707/741; 707/769; 705/14.1; 705/14.24; 705/14.52

(58) Field of Classification Search
USPC .......................................................... 707/741
See application file for complete search history.

(56) References Cited

U.S. PATENT DOCUMENTS

| | | | |
|---|---|---|---|
| 6,756,918 B2 * | 6/2004 | Fomukong | 340/988 |
| 7,626,496 B1 * | 12/2009 | Asher | 340/531 |
| 8,359,235 B1 * | 1/2013 | Santoro et al. | 705/14.49 |
| 2005/0027705 A1 * | 2/2005 | Sadri et al. | 707/5 |
| 2006/0026170 A1 * | 2/2006 | Kreitler et al. | 707/10 |
| 2010/0138294 A1 * | 6/2010 | Bussmann et al. | 705/14.49 |
| 2010/0198862 A1 * | 8/2010 | Jennings et al. | 707/769 |
| 2010/0250552 A1 * | 9/2010 | Egnor | 707/741 |
| 2010/0272085 A1 * | 10/2010 | Baier | 370/338 |
| 2011/0250875 A1 * | 10/2011 | Huang et al. | 455/418 |
| 2012/0130969 A1 * | 5/2012 | Wong et al. | 707/706 |
| 2012/0179549 A1 * | 7/2012 | Sigmund et al. | 705/14.58 |

* cited by examiner

*Primary Examiner* — Binh V Ho
(74) *Attorney, Agent, or Firm* — Birch, Stewart, Kolasch & Birch, LLP (57) ABSTRACT

Techniques for storing and retrieving content associated with a specific geographic location include identifying discrete regions included in a bounding region and initializing a list of discrete regions and a count of identified local content. For each identified region: determining a number of content items included in the region; updating the region list with an ID of the identified region if it contains at least one content item; and adding the determined number of content items to the count of identified local content. Deciding whether to proceed to a next identified region includes determining if unprocessed regions remain and if a predetermined content limit was reached. The next region is then processed if there is a next region and the content limit has not been reached. The regions are processed, content IDs for content items associated with processed regions are located in a content database for further selection or serving.

10 Claims, 5 Drawing Sheets

| S2Cell ID | Local Advertiser | Ad ID | Precise Latitude/Longitude of Store |
|---|---|---|---|
| 12abcd34 | Alice's Laundromat | 29384710 | 34.960 deg. N, 97.840 deg. W |
| 12abcd35 | Bob's Pizza | 98274926 | 34.953 deg. N, 34.830 deg. W |
| (same) | Charlie's Coffee | 88907296 | 34.954 deg. N, 34.831 deg. W |
| (same) | McDonald's | 44929292 | 34.953 deg. N, 34.832 deg. W |
| ... | ... | ... | ... |
| 56492b73 | Sydney Kangaroos | 59201622 | -33.906 deg. S, 151.171 deg. E |
| (same) | McDonald's | 44929292 | -33.907 deg. S, 151.172 deg. E |

ADAPTIVE DISTRIBUTED INDEXING OF LOCAL ADVERTS

BACKGROUND

A challenge in building a scalable local advertising platform is to efficiently serve local adverts that are close to a particular physical location. The number of local adverts in the system may be on the order of billions and the physical location distribution of local ads can very skewed or otherwise unevenly distributed, with a large portion of ads residing in several densely populated regions. Difficulties arise in efficiently creating a local ads serving system because of these geographic non-uniformities.

The challenges of building a distributed indexing solution that works on billions of data points across multiple systems therefore poses unique and complex challenges.

SUMMARY

The present disclosure relates to systems and methods of data organization and retrieval and also to the storage and retrieval of location-specific or location-related content.

A variation of the systems and techniques discussed herein relates to a method of serving content associated with a specific geographic location to a requesting device, the method comprising: receiving a content request and a geographic location associated with the content request from a requesting device; defining a bounding region around the geographic location; identifying one or more discrete local regions at least partially included in the bounding region; for each identified discrete local region determining a number of local content items included in the discrete local region; updating a list of discrete local regions with an ID of the identified discrete local region responsive to a determination that there is at least one local content item included in the discrete local region; and adding the determined number of local content items to a count of identified local content; and proceeding to the next identified discrete local region only responsive to a determination that there is a next identified discrete local region and a determination that a predetermined content count limit has not been reached; providing data to the requesting device, where the provided data includes data about at least one content item retrieved from a content database based on a content ID of a content item associated with an identified discrete local region included in the list of discrete local regions.

Some variations of such a method further comprise initializing the list of discrete local regions after said identifying; and initializing the count of identified local content after said identifying. Other variations comprise making the determinations of whether there is a next identified local region and whether the predetermined count limit has been reached or, in some cases, exceeded.

In some variations, the content item is an advertisement and the content database is an ads database. In some variations the discrete local regions are S2Cells. In some variations, the step of defining a bounding region includes setting a bounding region size based on the specific geographic location.

Another variation of the systems and techniques discussed herein relates to a method of efficiently determining the number of local content items near a geographic location, the method comprising: defining a bounding region around the geographic location; selecting, from a distributed indexed table, one or more discrete local areas at least partially included in the bounding region, where said local areas are selected based on their associated index values; and where the associated index values for physically close local areas are numerically close so that a continuous set of index values in the distributed indexed table is stored on a particular device included distributed storage system; building a data summary for the identified discrete local areas, said building including creating, in a memory portion of the particular device, an array-type data structure having at least two array cells and an membership test condition for each cell, where each array cell is associated with a particular number or numerical range of content items; testing, with at least one processor, the associated index value of each selected discrete local area against each membership test condition to determine a number of content items in the discrete local area; and placing the associated index value of a particular selected local area into a particular array cell responsive to an indication during said testing that the particular selected local area meets the criteria of the membership test condition associated with that array cell, said adding being performed with said processor; where the data summary is represented by the cells of the array-type data structure after said testing; and using the data summary instead of a database query to provide a content server with information about numbers of content items in one or more portions of the bounding region.

In some variations, there is no array cell representing zero. In other variations, the array-type data structure is a histogram having at least two buckets; and the membership test condition for each bucket is a Bloom filter. In yet other variations, the information about numbers of content items includes information about how many content items are in the bounding region and how the content items are distributed in the bounding region.

In some variations, the content items are advertisements associated with precise geographic locations within the discrete local areas. In other variations, the discrete local area is an S2Cell. In yet other variations, the index value of each discrete local area is a 64-bit identifier. In further variations, the distributed indexed table has a plurality of rows and each row in the table includes a content item identifier and a precise geographic location such that each row is uniquely identified by the combination of the content item identifier and the precise geographic location. In yet further variations, more than one row in the distributed indexed table may have the same index value.

Another variation of the systems and techniques discussed herein relates to a data structure embodied on a non-transitory computer-readable storage medium, the data structure comprising: an indexed table of geographic locations, where each row in the table has a numerical index value representing a geographic region and where numerically adjacent index values represent physically nearby geographic regions; where the non-transitory computer-readable storage medium is a distributed storage system including a plurality of storage devices; and where the table is stored on the plurality of storage devices in numerical order based on the index values such that each storage device includes a numerically contiguous portion of table entries that correspond to a geographically contiguous set of regions.

In some variations, the numerical index value is a 64-bit identifier configured such that when a larger geographic region is divided into smaller adjacent geographic regions, the smaller geographic regions have identifiers that include the identifier of the larger region. In other variations, each row in the table includes a content item identifier and a precise geographic location such that each row is uniquely identified by the combination of the content item identifier and the precise geographic location. In yet other variations, the content item identifier is associated with an advertisement stored in an ads database.

Another variation of the systems and techniques discussed herein relates to a method of summarizing a portion of a distributed index table having index values representing S2Cells, the method comprising: Identifying a geographic origination point; defining a bounding region around said origination point; selecting, from the distributed index table, one or more S2Cells at least partially included in the bounding region, where said S2Cells are selected based on their associated index values; each S2Cell is represented by a table entry having a unique index value; and where the associated index values for physically close S2Cells are numerically close so that a continuous set of index values in the distributed indexed table is stored on a particular device included distributed storage system such that said selecting is accomplished by only accessing the continuous set of index values stored on the particular device; creating, in a memory portion of the particular device, a histogram having at least two buckets and having a Bloom filter for each bucket, where each bucket is associated with a particular non-zero number or numerical range of advertisements included in an S2Cell; testing, with at least one processor, the associated index value of each selected S2Cell against each Bloom filter to determine a number of advertisements associated with each selected S2Cell; and placing the associated index value of a particular selected S2Cell into a particular histogram bucket responsive to an indication during said testing that the particular selected S2Cell meets the criteria of the Bloom filter associated with that histogram bucket, said adding being performed with said processor; where the summarized portion of the distributed index table is represented by the histogram after said testing and where the summarized portion of the distributed index table include information about the number and distribution of advertisements in the bounding region based on the S2Cells included in said bounding region.

Other variations of a method may include identifying a predetermined number of advertisements within the bounding region by, starting at the S2Cell closest to the origination point, first adding the histogram bucket value of the S2Cell to a requested advertisement count; second adding the index value of the S2Cell to a requested advertisement location list; first determining whether the requested advertisement count is below the predetermined number of content items; second determining whether the S2Cell is the last S2Cell in the bounding region; and responsive to determinations that the requested advertisement count is below the predetermined number of advertisements and that the S2Cell is not the last S2Cell in the bounding region, moving to the next-closest S2Cell and performing said first and second adding and said first and second determining steps; extracting advertisement IDs from the table entries associated with the index values in the requested advertisement location list; and providing, to an ads database, a list of the extracted advertisement IDs.

Another variation of the systems and techniques discussed herein relates to a system having one or more processors and one or more computer-readable memory portions, which may include non-transitory storage media, having instructions thereon which, when read by the processor(s), cause the processors to execute some or all of the methods or method variations described above.

Yet another variation of the systems and techniques discussed herein relates to non-transitory computer-readable media having stored thereon instructions or data for embodying some or all of the data structure or data structure variations described above or some or all of the methods or method variations described above or some combination thereof.

Further scope of applicability of the systems and methods discussed will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Local advertisements are advertisements associated with a precise geographic location or particular geographic area. In some cases, when a data access device submits an advertisement request, that request is associated with a geographic location. In such cases, it may be desirable to serve advertisements that are at or close to the geographic location associated with the advertisement request.

There are several constraints related to the building of an efficient local ads serving system:

a. Ads may be partitioned and stored across multiple computers;

b. An ad server is generally different from the server(s) where local ads are stored (web services above a trivial size typically separate the database back-end and front-end servers);

c. During the run time, for each query sent from a publisher (or device) to an ads server, only a small fraction of the ad candidates should be retrieved from the ads storage server and sent to the ads server;

d. Distributed storage systems typically employ some form of replication or data redundancy; and e. Content (i.e. the actual ads themselves) is generally not evenly distributed with respect to geographic location.

Solutions to the difficulties associated with large-scale, location-aware ad serving systems may include adaptive indexing techniques whereby the index of local advertisements is self-adjusting or, in some cases, dynamically created on a per-request basis. Solutions may also include query performance optimizations related to location-based services. Data summarization on distributed, terabyte-scale (or larger) systems is a significant and complex task.

The following discussion relates to serving advertisements within a spherical geometry system based on the concept of S2Cells, which are conventional geometric constructs that represent certain areas or bounded regions on the surface of a sphere. Each S2Cell has an associated level that relates to a level of granularity. The top level represents the entire sphere, and the lowest level represents the finest geographic resolution available in the sphere.

In one variation of a geographic indexing system, each data point related to a location on the earth is mapped to an S2Cell. In other variations, specific portions of a region, such as a continent or a state or a city, may be mapped to one or more S2Cells.

Figure 1:
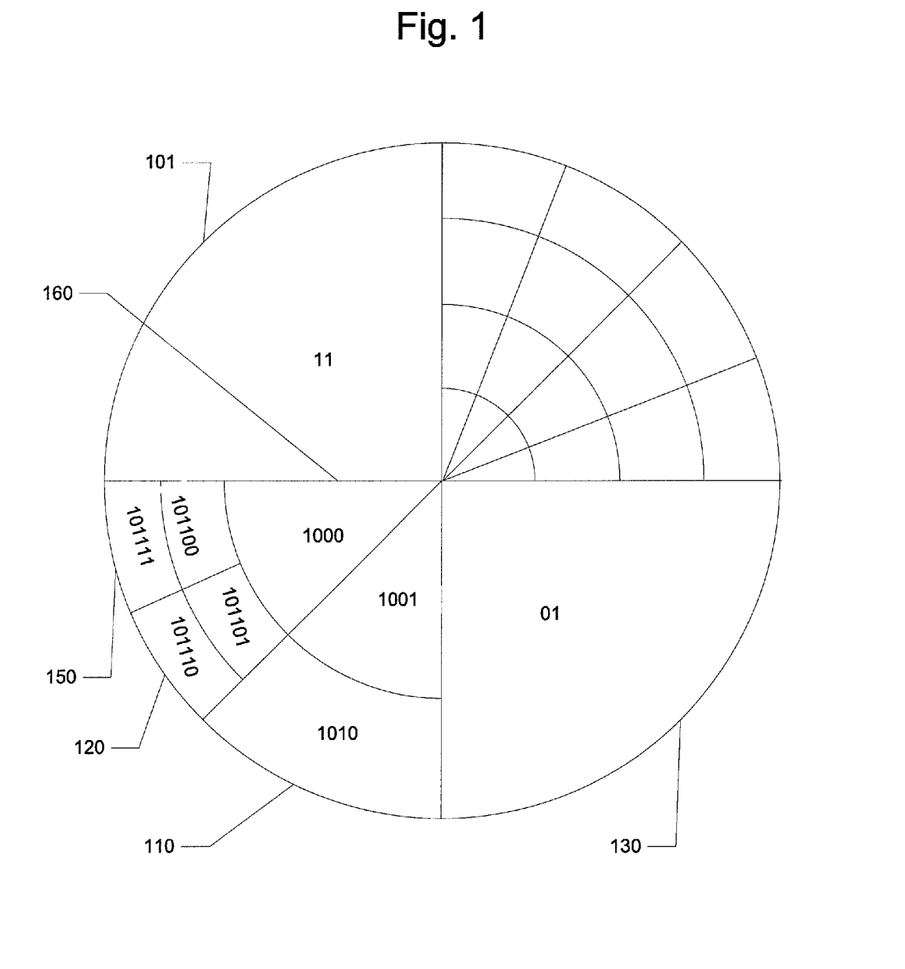
FIG. 1 depicts an embodiment of a spatial region being divided into sub-regions.

In some variations, an S2Cell can be represented by a 64 bit integer. In such a variation, each group of two bits may uniquely represent an area at a certain level of granularity. As shown in FIG. 1, an overall geographic area 101 may be divided at a first level of granularity into four regions, each region 130 having a unique 2-bit identifier. In some variations, a typical size of S2Cell level useful for the indexing of local advertisements might be 160,000 square meters (400 meters on a side). Other variations may use larger or smaller areas.

S2Cells within a particular high-level area can share the same bit prefix. For example, the large cells 160, 110 within one quadrant of the overall area 101 have the quadrant prefix 10 followed by a cell designation. The four large cells would therefore have 1000, 1001, 1010, and 1011 as bit string identifiers.

In some cases, the bit string of a large-area S2Cell can be the prefix of the smaller S2Cells it contains. For example, the small cells 150, 120 that are created from a larger cell have the bit string prefix of the larger cell. In the example shown, a larger cell having bit string identifier 1011 is divided into four smaller cells having 101100, 101101, 101110, and 101111 as bit string identifiers. In other words, at the each level of granularity, the region may be divided into four sections, each section uniquely represented by a string of two bits prefixed by the S2Cell bit string of the higher-level S2Cell. Further division of sections into another level of granularity increases the value of the S2Cell ID at that new level of granularity because it has a longer bit string. At the first level of granularity, each S2Cell may be represented by two bits 130. At the third level of granularity, each S2Cell 150, 120 may be represented by six bits, two bits per level of granularity.

Other variations may be employed for mapping points on in geographic location to numeric IDs of keys such that nearby points have keys that are numerically close or otherwise numerically related. Some variations may include a k-d tree, for example.

Although FIG. 1 depicts a circle, a similar approach may be employed for sub-dividing and indexing any two-dimensional shape or area, including the surface of a sphere. As such, such sub-division techniques may readily be applied to the surface of the earth or portions thereof.

All local ads for a particular address, coordinate set, or bounded region on earth can be mapped the same S2Cell level and stored in a distributed key value store, with the S2Cell string as the key and the information of all local ads falling into that cell as the value. In variations where a particular business or bounded region exceeds the size of an individual S2Cell (such as, for instance, a golf course or a resort), a local ad for that particular business or region may be mapped to an S2Cell associated with the precise address of the business or may be mapped to all S2Cells included in the region.

Figure 2:
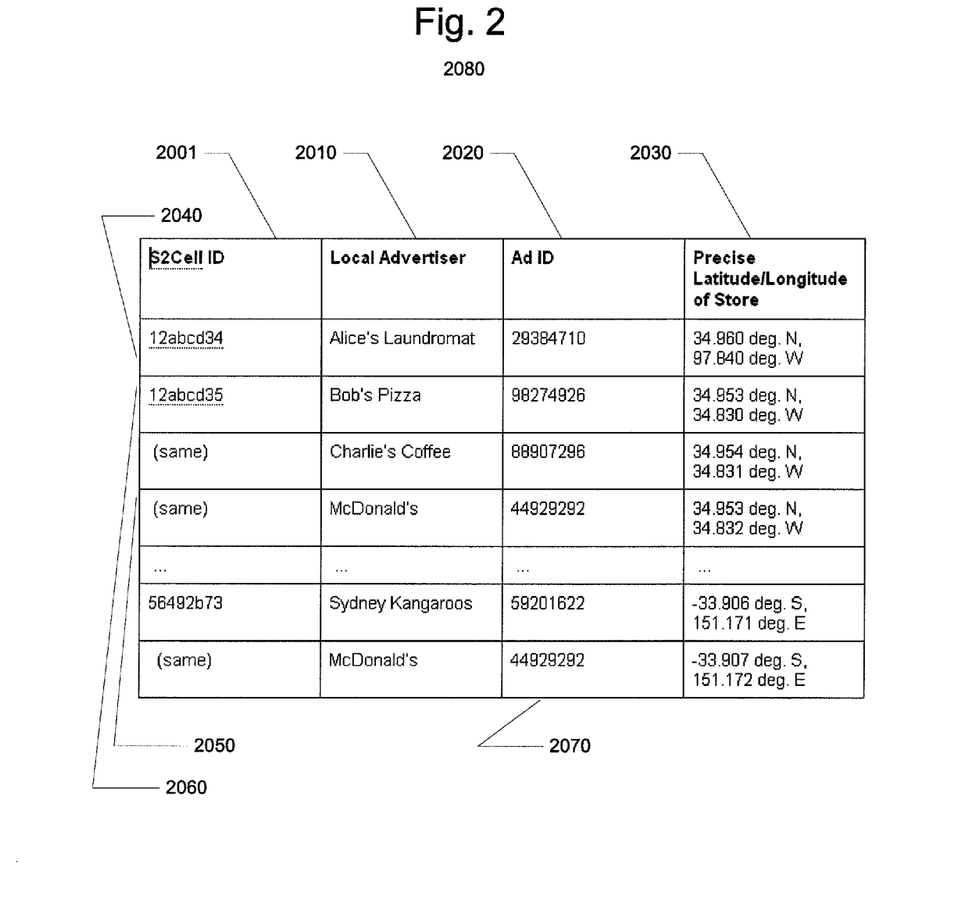
FIG. 2 depicts an embodiment of a table that relates a sub-region ID and an ad ID.

The distributed key value store can be any commercially available, custom-built, or custom-configured big data solution. A variation of such a key value store is depicted in FIG. 2. The key value store 2080 shown in FIG. 2 includes an S2Cell ID 2001, a local advertiser 2010, an ad ID 2020 that relates to the ID of an advertisement in an ads database, and a precise geographic location 2030 of the advertiser. As can be seen in the variation shown, Alice's Laundromat 2040 and Bob's Pizza 2060 are geographically close and also have S2Cell IDs that are numerically close.

The precise geographic location is related to, but not relationally linked to, the S2Cell ID. As shown in the table, Bob's Pizza and McDonald's have the same S2Cell ID 2050, 2060 but have different precise geographic locations. Also, an advertiser may have multiple S2Cell IDs 2050 2070 that share a common Ad ID. Each entry in the table 2080 is therefore uniquely identified by a combination of a precise geographic location and an ad ID whereas the S2Cell ID is used as the table 2080 index. The precise geographic location may be provided by the advertiser or derived from information known about the advertiser, such as one or more known addresses of their business(es). As shown in the table 2080, a particular ad or advertising campaign may be associated with multiple business locations 2050 2070 for a particular advertiser.

Replication and fault tolerance may be handled by the big data solution at the storage level. In some variations, offline jobs may be used to keep the key value store in sync with an ads database that stores the advertisements themselves. Such jobs may be run from the big data solution, the ads database, or one or more separate management or maintenance tools.

Figure 3:
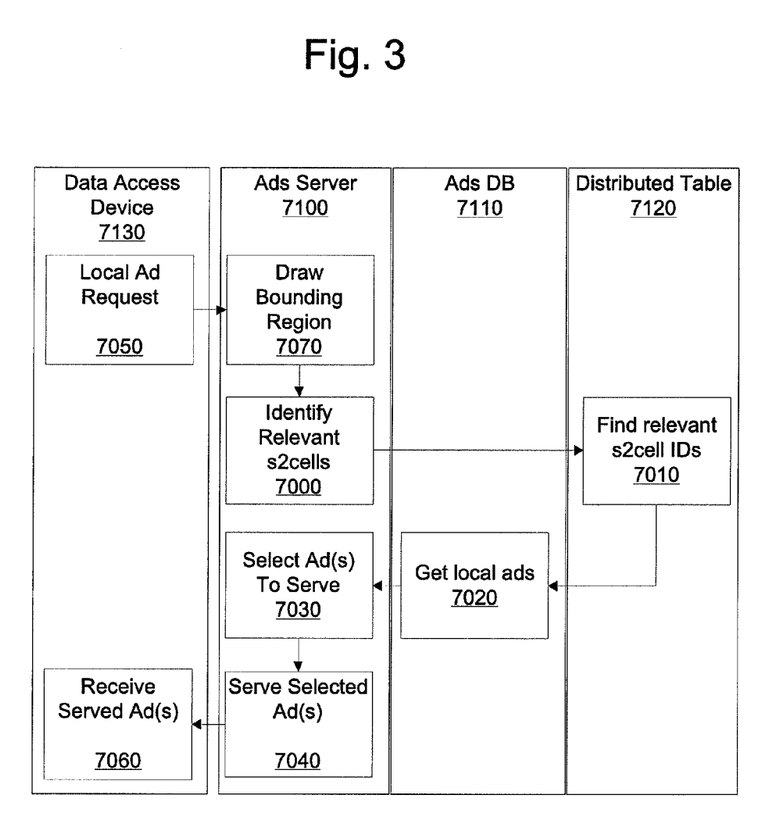
FIG. 3 depicts an embodiment of an ad serving system that can serve local ads.

An embodiment of an ad serving system that stores and serves local ads as discussed herein id shown in FIG. 3. A data access device 7130 such as a mobile phone, smartphone, tablet, laptop, netbook, or other portable computing device, may generate a local ad request 7050 that includes, as part of the request, a precise geographic location of the data access device 7103. An ads server 7100 may receive this ad request and, as part of a query to the ads database 7110, for mobile ad requests with precise geo-location, such as requests coming from a device with GPS or other self-location capability, the ads server may draw a bounding region 7070 around the requested or identified location. This bounding region may be a fixed radius/value or may be based on particular parameters of the device, location, inferred movement parameters, or other related factors. In some variations, such a bounding region may be a bounding box having sides measured in miles or kilometers or fractions thereof.

After the region is selected or set, the ads server may compute or look up all the S2Cell ids in the region 7000. In some variations, this is a simple mathematical operation that may be accomplished as an in-memory operation by the ads server. Once the bounding region is defined 7070 and the S2Cells within the region identified 7000, a data summary may be used to select only a subset of the identified S2Cells 7010 (or, in variations where there are no local ads near the users, to inform the ads server that there are no local ads). This data summary may be created either in the ads server 7100 or as part of a query to a distributed table 7120 storing S2Cell IDs and related ad IDs.

The selected S2Cells may then be looked up to identify the local ads associated with those cells. This last look-up operation may be done in an external database or table such as the distributed table 7120 (an example of which was shown in FIG. 2), which may then provide the ad IDs for the local ads to an ads database 7110, which in turn retrieves the local ads 7020 and provides them to the ads server 7100 for selection 7030 and serving 7040. The data access device 7130 then receives the served ad(s) 7060 and presents them to a device user.

The distributed table 7120 stores the ad IDs associated with local ads and indexes these IDs according to their associated S2Cell(s), which may be determined based on the address(es) or coordinates associated with an ad. The ad IDs correspond to ads in the ads database 7110. However, because an individual ad ID may be associated with multiple S2Cells, and because an S2Cell may include multiple ads, the distributed table 7120 can easily become very large. In some cases, it may become too large for any one memory device to contain. In some cases, even if the distributed table 7120 can be contained in a single memory device, it may not be desirable to do so because of potentially long data search and retrieval times. The distributed table 7120 is therefore preferably stored in a distributed fashion across multiple memory devices and, in some cases, across multiple machines.

Since S2Cells that are close to each other tend to share the same long prefixes, and the key value store of the distributed table is sorted based on key prefixes, all S2Cells generated for each query are very likely to be on the same machine due to the numerical sequence of the indexing structure. Many big data solutions will store entries with nearby keys on the same machine, or otherwise arrange data so that nearby keys can be looked up with a minimum amount of additional latency and resources. Since geographic proximity and numerical proximity are closely related in variations using the bit-value indexing scheme discussed above (or variations thereon), keys that are numerically nearby from the standpoint of the big data solution are geographically nearby because of the indexing scheme.

Any given location-based ad request will only request S2Cells that are close to each other, meaning only those S2Cells that are within the same bounding box around the request origination point, thus decreasing average latency and overall machine usage for all location-based ads. This provides improved efficiency in data organization and data retrieval by eliminating issues related to latency and coordination between multiple devices. The location-based ad request origination point may be a geographic location associated with a location-aware or locatable mobile device, such as a GPS device, a smartphone, a tablet, or any computing device having an IP address or using cellular data network, or may be associated with a map search or other location-related data request.

The ads server may then compute the distance between the precise locations of the local ads and the ad request location, and combine all local ads with other ad types in auction to select the final winners. In one variation, the ads server may retrieve a unique identifier of each local advertisement (an ad ID, for example) from the distributed table or database. These ad IDs may then be combined with other ad IDs during an ad selection, ranking, or auction process to determine which ad to serve, with the winners of the selection, ranking, or auction process being looked up in the ads database for serving in response to the ad request.

Although the S2Cells at a particular granularity level are distributed uniformly over the earth, the local ads associated with particular S2Cells are not distributed uniformly. Local ads will tend to be concentrated in densely populated areas, which represent a small portion of all S2Cells. Due to this uneven location distribution, some S2Cell keys can have too many local ads mapped to them. Such cells may be further split or divided into lower granularity levels with smaller sizes. The mechanics of such density-based cell-splitting may be handled by the big data solution. The thresholds for determining a maximum or desired overall ad density for S2Cells may be a parameter provided to the big data solution or may be included as one or more maintenance or offline processing jobs operating on or included with the big data solution.

In one variation, an offline process may periodically rebuild the distributed table 7120. Such a process may, during each rebuild, make a decision to split an S2Cell into smaller S2Cells if the number of ads in the S2Cell exceeds a certain threshold amount or density level (for example, twenty ads in an S2Cell at a kilometer-level may be acceptable, twenty ads in an S2Cell at a meter-level granularity S2Cell may be too many). These threshold levels may be pre-set or may be determined experimentally based on computational tradeoffs and efficiencies realized in terms of fetching many ads in an S2Cell as opposed to fetching a higher number of S2Cells.

The resulting table still have S2Cell id as the table keys, but the keys can be from different levels. S2Cells from different levels that are physically nearby will still be close to each other in key space, so the advantages of looking up nearby S2Cells (latency, resources) are preserved even with mixed S2Cell levels.

For example, the area of New York City may be divided into the most granular S2Cell levels possible due to the amount of merchants and advertisers concentrated therein. By contrast, most of Alaska may be divided into a handful or less of S2Cells because it is so sparsely settled.

This disparity between S2Cell density and therefore S2Cell granularity levels makes data summarization a relevant aspect of query optimization. Data summaries for spatial databases are useful query performance optimization tools for many location-based services, and the non-uniformity of the data distribution in the present S2Cell variation may benefit significantly from it. Data summarization keeps the number of local ads retrieved either bounded or roughly uniform in each query.

One data summarization tool that may be employed in such a variation is a Bloom filter. A Bloom filter is a space-efficient probabilistic data structure that is used to test whether an element is a member of a set. False positives are possible, but false negatives are not; i.e. a query returns either "inside set (may be wrong)" or "definitely not in set". Elements can be added to the set, but not removed.

Bloom filters have a space advantage over other data structures for representing sets, such as self-balancing binary search trees, tries, hash tables, or simple arrays or linked lists of the entries. Most of these require storing at least the data items themselves, which can require anywhere from a small number of bits, for small integers, to an arbitrary number of bits, such as for strings Linked structures incur an additional linear space overhead for pointers. A Bloom filter with 1% error and an optimal value of k, in contrast, requires only about 9.6 bits per element—regardless of the size of the elements. This advantage comes partly from its compactness, inherited from arrays, and partly from its probabilistic nature. If a 1% false-positive rate is too high, adding about 4.8 bits per element decreases it by ten times.

In some variations, a trie structure may be used instead of a Bloom filter. In one variation, a trie structure may be used where the nodes represent S2Cells of particular levels and the leaves indicate how many local ads are in the given node.

In some variations, a data structure as discussed herein summarizes the information stored within it to efficiently answer a query about how many data objects are located in a particular physical region. Such variations may realize efficiencies in answering such a query by combining three ideas: geo-encoding, Bloom filters and histograms.

The geo-encoding aspect may be addressed by the S2Cell, which captures geographic location data in its key value. The Bloom filter is a space-efficient probabilistic data structure that is used to test whether an element is a member of a set. False positives are possible, but false negatives are not; i.e. a query returns either "inside set (may be wrong)" or "definitely not in set".

A variation using a series of bit vector-type Bloom filters, stored consecutively within a binary file, allows for highly efficient storage. It allows for the creation of a representation of local ads in an ads database with bit-level indexing. In such a variation, two megabytes of data may represent over 8 million different local ads.

Figure 4:
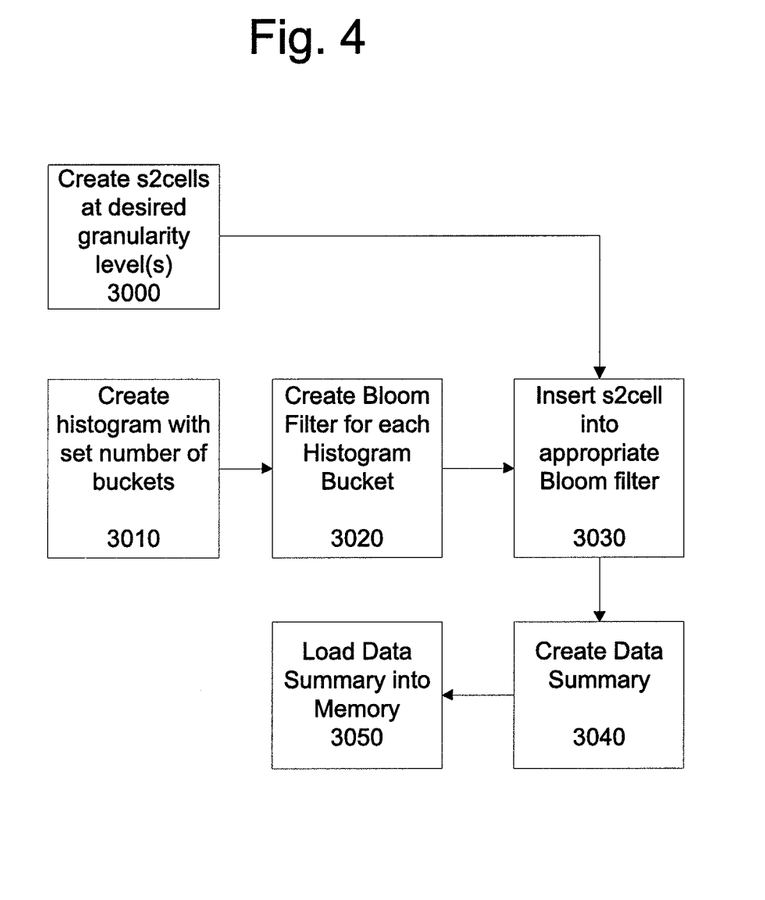
FIG. 4 depicts an embodiment of a data summary creation process.

An embodiment of a data summary creation process using Bloom filters is shown in FIG. 4. The process begins with the creation of a histogram having a set number of buckets 3010. In the context of this disclosure, each bucket in the histogram represents a number of local ads or range of local ad values associated with a particular S2Cell.

In the variation shown, each bucket in the histogram has a corresponding Bloom filter 3020. For example, a histogram with two buckets [1, 2], [3, inf] can be stored in two Bloom filters. In such variations, the data summary may also contain the range to which each Bloom filter corresponds to. In some variations, the range the Bloom filters correspond to can be fixed constants, in which case they don't need to be stored inside the data summary. However, variations that store them inside the summary allow for greater flexibility by making the summary data-driven. The number of Bloom filters and their parameters may be adjusted over time without having to re-configure other aspects of the system or software. In some variations, Bloom filters and filter parameters may be adjusted over time as the distribution of local advertisements changes.

In some variations, the number of spatial objects residing in an S2Cell may be computed for each bit string representing an S2Cell by passing the bit string through the Bloom filters. For example, a variation of a data summary may contain 4 Bloom filters, each of which corresponds to a histogram bucket as follows:

| Histogram bucket | Matching S2Cell IDs |
| --- | --- |
| 1 | 12abcd34 |
| 2-3 | 12abcd35, 56492b73 |
| 4-10 | 223492bb, 6789872c |
| 11-inf | 5432cba3 |

To determine how many objects S2Cell 12abcd35 contains, each of the Bloom filters is tested in turn to see if it contains the hash of the bit string 12abcd35. In the example shown, the second bucket matches so the S2Cell contains between 2 and 3 objects. By contrast, looking up S2Cell 12abcd36 will show that none of these buckets match so the S2Cell is assumed to contain 0 objects. In the variation shown, some of the S2Cell IDs are those from FIG. 2. This is done for the purpose of example and illustration only. As can be seen in the table, S2Cell ID 12abcd34 is in the histogram bucket indicating one ad, which is what is shown in FIG. 2 for that S2Cell ID 2040. S2Cell ID 12abcd35, by contrast, in the histogram bucket indicating 2 or 3 ads, which is also consistent with FIG. 2 showing 3 ads for that S2Cell ID 2060 2050.

A corresponding histogram bucket is then identified based on the number of spatial objects associated with the first Bloom filter that indicates the S2Cell belongs to it. The S2Cell string is then added to the Bloom filter in that histogram bucket 3030. In some variations, an optimization may be employed where an S2Cell having no spatial objects (e.g. no local ads) will not be added to any histogram buckets. Since most S2Cells will be empty, such an optimization can provide significant increases in performance. By adding the string to the Bloom filter, the hash value based on this string and set the corresponding bits in the underlying bit vector can be mean computed.

The mean computed hash values for each string and corresponding Bloom filter are a data summary 3040 that represents all the S2Cell data in the distributed key value store. By loading this data summary into memory 3050, the server can quickly answer queries like:

a. Are there any database objects in this region?
    b. Approximately how many objects are in this region? (the region can be of arbitrary size, and can be later or separately decomposed into S2Cells)
    c. To get at least K objects, what are the S2Cells I need to include around this point?

The answer to the first question is a preliminary query in any local advertisement retrieval operation. If there are no database objects in the region, no further querying is needed as there are no local ads available. The answer to the second question determines the scope and complexity of a local ad retrieval operation. If the number of objects in a region exceeds some threshold level, the region may be pared down until an acceptable or manageable number of objects is achieved. The answer to the third question determines an appropriate or suitable region size for local ad retrieval. In some variations, all three questions can be answered at once.

Figure 5:
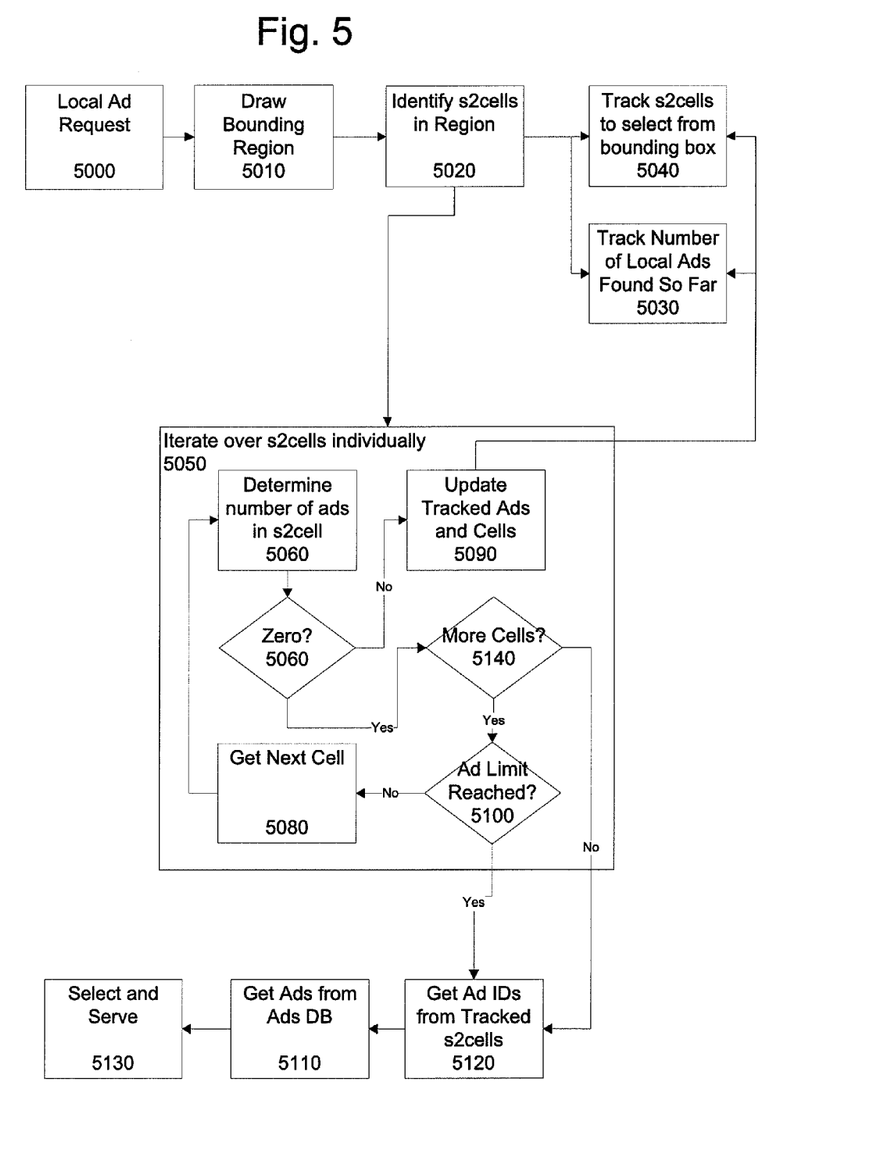
FIG. 5 depicts an embodiment of a local ad identification and selection process.

FIG. 5 shows a flowchart for a variation of an algorithm for determining the relevant S2Cells from the data summary that answers all three questions. This is only one possible variation but it demonstrates the features of: avoiding expensive lookups of S2Cells that have no local ads, selecting S2Cells within an adjustable distance from a location-aware ad request depending on local ad density, and placing a limit on the number of ads looked up.

Upon receiving a local ad request 5000, a bounding region is drawn 5010 around the location associated with the request. All the S2Cells contained within or overlapping with the bounding region are then identified 5010 and a count for the number of local ads found so far is initialized 5030. Also, a list of S2Cells to be selected from the bounding box is initialized 5040.

For each S2Cell individually 5050 the number of local ads in the S2Cell is determined 5060. This determination may be done based on a Bloom filter as discussed above. If the S2Cell contains ads, the count of ads and list of S2Cells are both updated 5090. The count is updated with the determined ad count and the S2Cell list is updated with the S2Cell ID.

If the S2Cell contains no ads 5060, it is discarded and the iteration loop checks if there is a next cell to proceed to 5140. If iteration is complete across all S2Cells in the region 5140, the iteration loop exits and returns the tracked data 5120.

If there is another cell to be processed, the iteration loop proceeds to the next cell 5080 unless a threshold condition, such as an upper limit of ads 5100 is met. The tracked data is returned 5120 if an upper limit of ads 5100 is reached and iteration is stopped regardless of whether there are un-processed S2Cells otherwise within the bounding region 5010.

This pre-set ad count threshold, which may be set as an absolute number of total ads or determined based on local ad density, may also govern the initial selection of S2Cells. By having a data structure with multiple Bloom filters that sort S2Cells by ad density, an ad request coming from an ad-dense area (such as, for example, in midtown Manhattan) may trigger the selection of fewer and smaller S2Cells close to the precise geographic location associated with the request.

Variations of the S2Cell iteration 5050 may proceed according to a wide range of sequences. In one variation, the iteration 5050 may proceed as an outward spiral starting with the S2Cell closest to the user's precise location. Other variations may use radiating patterns, concentric patterns, and other known or available iteration approaches.

The tracked data 5120 includes the ad IDs from the iterated-over S2Cells. These ad IDs can then be located in the ads database 5110 and passed to an ads server for an ad selection and serving 5130 process. Because a direct search of the ads database for location-bearing ads was not required, and because distributed table lookup was likely done on a single machine, the overall ad identification, retrieval, and serving process can be performed more quickly and with less computational overhead.

Although the above-discussed techniques and solutions for adaptive distributed indexing and data summarization have been described in the context of serving local ads in response to location-aware ad requests, these techniques may be generalized and applied to other situations involving distribution and delivery of location-related content. Regional announcements, such as weather alerts, pictures of local landmarks, or even particular audio or subtitle tracks for on-demand movies, may be indexed and efficiently located for delivery using the techniques discussed herein.

Only exemplary embodiments of the present invention are shown and described in the present disclosure. It is to be understood that the present invention is capable of use in various other combinations and environments and is capable of changes or modifications within the scope of the inventive concept as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the invention, and all such modifications as would be obvious to one skilled in the art are intended to be included within the scope of the following claims.

The invention claimed is:

1. A method of efficiently determining the number of local content items near a geographic location, the method comprising:
   defining a bounding region around the geographic location;
   selecting, from a distributed indexed table, one or more discrete local areas at least partially included in the bounding region,
   where said local areas are selected based on their associated index values; and
   where the associated index values for physically close local areas are numerically close so that a continuous set of index values in the distributed indexed table is stored on a particular device included distributed storage system;
   building a data summary for the identified discrete local areas, said building including
   creating, in a memory portion of the particular device, an array-type data structure having at least two array cells and an membership test condition for each cell, where each array cell is associated with a particular number or numerical range of content items;
   testing, with at least one processor, the associated index value of each selected discrete local area against each membership test condition to determine a number of content items in the discrete local area; and
   placing the associated index value of a particular selected local area into a particular array cell responsive to an indication during said testing that the particular selected local area meets the criteria of the membership test condition associated with that array cell, said adding being performed with said processor;
   where the data summary is represented by the cells of the array-type data structure after said testing; and
   using the data summary instead of a database query to provide a content server with information about numbers of content items in one or more portions of the bounding region.

2. The method of claim 1, where there is no array cell representing zero.

3. The method of claim 1, where the array-type data structure is a histogram having at least two buckets; and
   where the membership test condition for each bucket is a Bloom filter.

4. The method of claim 1, where said information about numbers of content items includes information about how many content items are in the bounding region and how the content items are distributed in the bounding region.

5. The method of claim 1, where the content items are advertisements associated with precise geographic locations within the discrete local areas.

6. The method of claim 1, where the discrete local area is an S2Cell.

7. The method of claim 1, where the index value of each discrete local area is a 64-bit identifier.

8. The method of claim 1, where the distributed indexed table has a plurality of rows and each row in the table includes a content item identifier and a precise geographic location such that each row is uniquely identified by the combination of the content item identifier and the precise geographic location.

9. The method of claim 8, where more than one row in the distributed indexed table may have the same index value.

10. A system, the system comprising:
    a processor;
    a non-transitory computer-readable memory containing instructions which, when read by the processor, cause the processor to perform a method of efficiently determining the number of local content items near a geographic location, the method including the steps of
    defining a bounding region around the geographic location;
    selecting, from a distributed indexed table, one or more discrete local areas at least partially included in the bounding region,
    where said local areas are selected based on their associated index values; and
    where the associated index values for physically close local areas are numerically close so that a continuous set of index values in the distributed indexed table is stored on a particular device included distributed storage system;
    building a data summary for the identified discrete local areas, said building including
    creating, in a memory portion of the particular device, an array-type data structure having at least two array cells and an membership test condition for each cell, where each array cell is associated with a particular number or numerical range of content items;

testing, with at least one processor, the associated index value of each selected discrete local area against each membership test condition to determine a number of content items in the discrete local area; and placing the associated index value of a particular selected local area into a particular array cell responsive to an indication during said testing that the particular selected local area meets the criteria of the membership test condition associated with that array cell, said adding being performed with said processor;

where the data summary is represented by the cells of the array-type data structure after said testing; and using the data summary instead of a database query to provide a content server with information about numbers of content items in one or more portions of the bounding region.

\* \* \* \* \*